(12) United States Patent
Edelmann et al.

(10) Patent No.: US 10,011,088 B2
(45) Date of Patent: Jul. 3, 2018

(54) PROCESS FOR PRODUCING A FIBER COMPOSITE COMPONENT, AS WELL AS A SEMI FINISHED ASSEMBLY FOR PRODUCING A FIBER COMPOSITE COMPONENT

(71) Applicant: Premium Aerotec GmbH, Augsburg (DE)

(72) Inventors: Klaus Edelmann, Bremen (DE); Tanja Frese, Horstedt (DE); Philip Hasemann, Butjadingen (DE); Juergen Krone, Elsfleth (DE); Helmut Krumpen, Grossenkneten (DE); Andreas Leis, Delmenhorst (DE); Angelos Miaris, Bremen (DE); Tim Neitzel, Bremen (DE); Arnoldt Quiring, Stade (DE)

(73) Assignee: Premium Aerotec GmbH, Augsburg (DE)

( * ) Notice: Subject to any disclaimer, the term of this patent is extended or adjusted under 35 U.S.C. 154(b) by 697 days.

(21) Appl. No.: 14/558,814

(22) Filed: Dec. 3, 2014

(65) Prior Publication Data

US 2015/0151507 A1 Jun. 4, 2015

(30) Foreign Application Priority Data

Dec. 4, 2013 (DE) .......................... 10 2013 018 148

(51) Int. Cl.
*B29C 51/30* (2006.01)
*B32B 5/02* (2006.01)
(Continued)

(52) U.S. Cl.
CPC ................ *B32B 5/02* (2013.01); *B29C 70/46* (2013.01); *B29C 70/541* (2013.01); *B32B 3/06* (2013.01);
(Continued)

(58) Field of Classification Search
CPC ................................ B32B 7/08; B29C 70/543
See application file for complete search history.

(56) References Cited

U.S. PATENT DOCUMENTS 5,906,269 A * 5/1999 Zabron ................. B29C 70/081
198/846
6,054,003 A 4/2000 Bak et al.
(Continued)

FOREIGN PATENT DOCUMENTS

DE          697 06 651 T2     7/2002
DE      10 2009 016 215 A1   10/2010
(Continued)

OTHER PUBLICATIONS

European Search Report dated Apr. 30, 2015 with partial English-language translation (two (2) pages).

*Primary Examiner* — Galen H Hauth
(74) *Attorney, Agent, or Firm* — Crowell & Moring LLP

(57) ABSTRACT

A semi-finished product arrangement for producing a fiber composite component by molding a planar semi-finished fiber composite product in a molding tool is provided. The arrangement includes the semi-finished fiber composite product and multiple holding elements fixed in place thereon and each extending beyond the edge of the semi-finished fiber composite product. The holding elements are countersunk in recesses of the semi-finished fiber composite product, in order to avoid a projection in terms of height.

8 Claims, 4 Drawing Sheets

Figure 1:
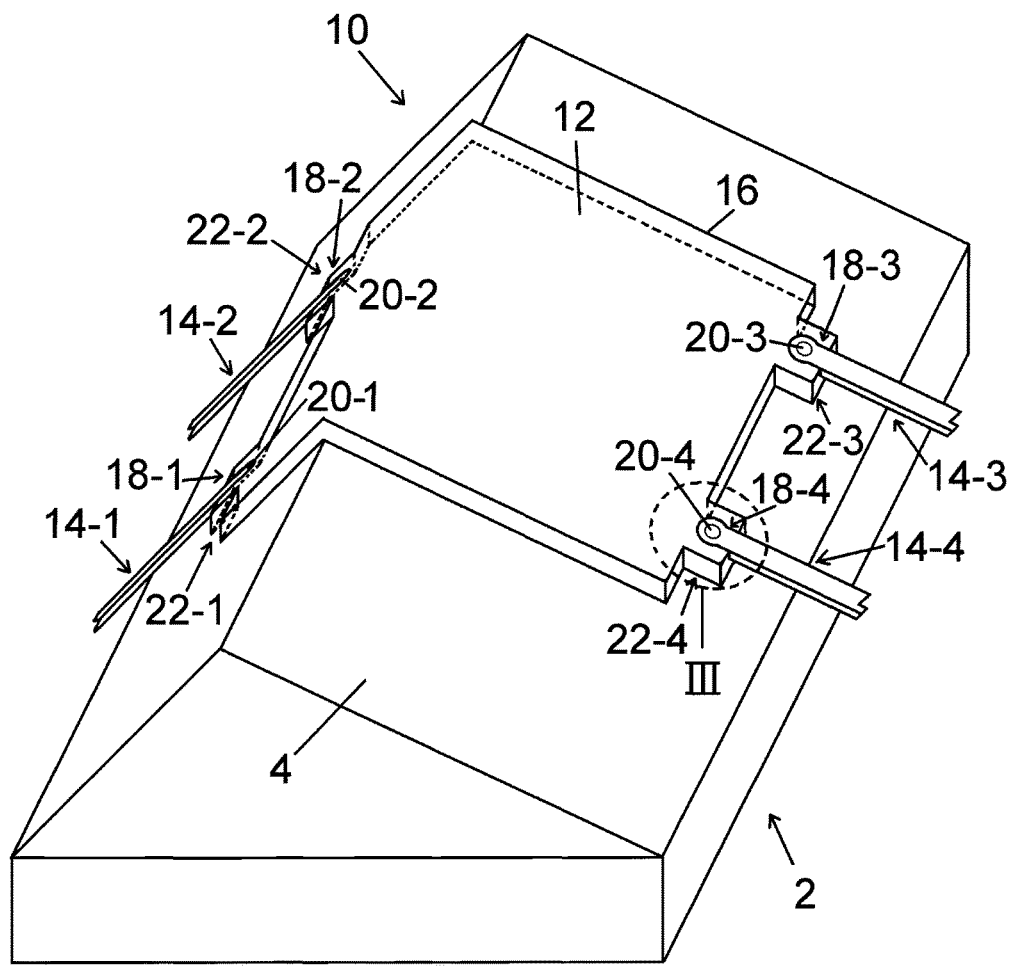

(51) Int. Cl.
  *B32B 38/00*    (2006.01)
  *B32B 37/18*    (2006.01)
  *B32B 3/06*     (2006.01)
  *B32B 3/08*     (2006.01)
  *B29C 70/46*    (2006.01)
  *B29C 70/54*    (2006.01)
  *B29K 105/08*   (2006.01)

(52) U.S. Cl.
  CPC ............... *B32B 3/08* (2013.01); *B32B 37/18* (2013.01); *B32B 38/0012* (2013.01); *B29K 2105/08* (2013.01); *B32B 2605/00* (2013.01); *Y10T 156/1002* (2015.01); *Y10T 428/24521* (2015.01); *Y10T 428/24545* (2015.01)

(56) References Cited

U.S. PATENT DOCUMENTS

| | | | |
|---|---|---|---|
| 2004/0028877 A1* | 2/2004 | Itoh | B29C 73/04 |
| | | | 428/118 |
| 2004/0217497 A1* | 11/2004 | Engwall | B29C 70/545 |
| | | | 264/40.1 |
| 2007/0136989 A1* | 6/2007 | Lee | E05D 11/0054 |
| | | | 16/254 |
| 2010/0193114 A1* | 8/2010 | Millar | B29C 70/443 |
| | | | 156/245 |
| 2011/0115128 A1* | 5/2011 | Bochinger | B29C 53/04 |
| | | | 264/322 |

FOREIGN PATENT DOCUMENTS

| | | |
|---|---|---|
| DE | 10 2012 010 497 A1 | 12/2012 |
| WO | WO 2009/130120 A1 | 10/2009 |

\* cited by examiner

PROCESS FOR PRODUCING A FIBER COMPOSITE COMPONENT, AS WELL AS A SEMI FINISHED ASSEMBLY FOR PRODUCING A FIBER COMPOSITE COMPONENT

BACKGROUND AND SUMMARY OF THE INVENTION

Exemplary embodiments of the present invention relate to a semi-finished product arrangement, a method for the production of a fiber composite component, and use of such a semi-finished product arrangement.

For the production of a fiber composite component by molding (e.g. punch molding) of a planar semi-finished fiber composite product in a molding tool (e.g. molding press), "semi-finished product arrangements" are known from the state of the art, which comprise the semi-finished fiber composite product and multiple holding elements attached thereto and each extending beyond the edge of the semi-finished fiber composite product.

In the known methods for the production of a fiber composite component using such a semi-finished product arrangement, this semi-finished product arrangement is molded with a semi-finished fiber composite product edge that projects out of the molding tool all around. The holding elements that serve for holding the semi-finished fiber composite product during the molding process (and, if necessary, during prior heating of the semi-finished fiber composite product), in this connection, are not allowed to lie in the region of the molding tool (press region), because otherwise they would damage the tool.

A disadvantage of this state of the art is the often significant additional material expenditure for the semi-finished fiber composite product to be molded, in order to provide for the above-mentioned "projecting edge of the semi-finished fiber composite product."

Exemplary embodiments of the present invention are directed to an improved semi-finished product arrangement, method for the production of a fiber composite component, use of such a semi-finished product arrangement, the results in the fiber composite component production being implemented with less material expenditure.

According to a first aspect of the invention, in a semi-finished product arrangement the holding elements countersunk in recesses of the semi-finished fiber composite product, in order to avoid a projection in terms of height.

This allows the edge of the semi-finished fiber composite product to run at least in part, particularly entirely within the molding tool during the molding process, the countersunk arrangement of the holding elements, however, reducing or entirely eliminating the risk of damage to or wear of the molding tool caused by the holding elements.

According to one embodiment, the recesses each possess a contour that is adapted to the contour of the holding element in question. This particularly covers the case where, seen in a top view, at most a small gap remains between the contour of the holding element in question and the contour of the recess in question. In other words, in this case the holding element contour is arranged in the recess contour without or at most with "slight play."

In a possible embodiment variant, the recess is worked in from the lateral edge of the semi-finished fiber composite product, with a certain recess height (orthogonal to the plane of the semi-finished fiber composite product), which height is less than the height (thickness) of the semi-finished fiber composite product and greater than or equal to the height (thickness) of the holding element. After the holding element in question has been laid/pushed into place (from the side) in such a lateral recess, the surfaces, on both sides, of the holding element arranged to be countersunk are each covered by material of the semi-finished fiber composite product, and the holding element is arranged to be more or less "completely countersunk."

In another preferred embodiment variant, the recess on one of the two flat sides of the semi-finished fiber composite product is worked in with a certain recess depth that is less, for example, than the height (thickness) of the semi-finished fiber composite product. After the holding element has been laid into place (from the side) in such a recess, an "exposed surface" of the holding element arranged to be (completely or partially) countersunk occurs.

In one embodiment, the exposed surfaces of the holding elements arranged to be countersunk are each arranged to be countersunk or at most substantially flush with the surface of the semi-finished fiber composite product, in the region bordering on the recess.

This avoids a noteworthy projection in terms of height of the holding elements and this prevents or accordingly reduces possible tool wear.

For the case that during the molding process compression of the semi-finished fiber composite product, in terms of height, also takes place, it is preferred if the exposed surfaces of the holding elements arranged to be countersunk are each countersunk with reference to the surface of the semi-finished fiber composite product, in the region bordering on the recess. This "countersunk arrangement of the exposed surfaces" can, in this connection, be adapted, in terms of extent, to the molding process to be performed, in such a manner that during the molding process, no noteworthy force (thereby causing wear) is exerted on the molding tool by the holding elements arranged to be countersunk.

In one embodiment the holding elements (or at least part thereof) are each configured as elongated holding rods or holding wires having a circular cross-section, for example, or an at least approximately square cross-section, for example. A corresponding transverse expanse or diameter in this connection can lie in the range of about 0.2 to 4 mm, for example. Such a holding wire can be angled away at its proximal end (i.e., provided for fixation on the semi-finished fiber composite product), in order to engage into a corresponding fixation recess of the semi-finished fiber composite product. Alternatively, this end can be bent to form a flat eye, for example, in order to be able to implement attachment by means of riveting.

In another embodiment, the holding elements (or at least part thereof) are each configured as elongated holding strips arranged co-planar to the plane of the semi-finished fiber composite product.

In this way, great mechanical strength (here, for example, tensile strength) is achieved at a simultaneous comparatively small height (thickness) of the holding elements.

The ratio of the width of the holding strips to the height (thickness) of the holding strips is preferably greater than 3, particularly 5, and, on the other hand, less than 100, particularly 50, for example.

In one embodiment, the holding elements are formed from a metal material (e.g., aluminum, steel, etc.). Alternatively, other materials can also be provided for this purpose, particularly plastic or plastic composite materials (e.g., plastic having a high melting point or duroplastic/glass fiber reinforced plastic).

In a preferred embodiment, the holding elements (or at least those sections of them situated within the molding tool during the later molding process) are formed from a material that is softer than the material of the molding tool used for the molding process (in order to avoid excess tool wear).

In one embodiment, the holding elements each possess a shape suitable for implementing a tension spring effect. The holding elements can have such a shape particularly in a distal section (i.e. situated at a distance from their fixation location on the semi-finished fiber composite product) of the element, which section lies outside of the molding tool during the later molding process.

In the aforementioned configuration of the holding elements as elongated holding strips, in each instance, a wave-like or zigzag-like course of the holding strips in a distal region (seen from the side) can be provided.

There are various possibilities to be considered for the fixation of the holding elements on the semi-finished fiber composite product.

Because in practice, generally only a tension effect by means of the holding elements, which "spreads out" the semi-finished fiber composite product, is required, the fixation connection can be configured, for example, as a suitable (i.e. tension-resistant) shape-fit connection. An example of this would be a holding element that engages into a corresponding fixation recess of the semi-finished fiber composite product at its proximal end, with a section that runs in the height direction of the semi-finished fiber composite product (e.g. a formed-on projection, angled portion or "hook").

In another embodiment, the fixation connection is provided as an attachment connection, for example by means of adhesively attaching proximal sections of the holding elements, in each instance, to the semi-finished fiber composite product. For this purpose, adhesive layers can be arranged between the respective recess bottoms and the holding elements, for example, if the holding elements are arranged to be countersunk in recesses, or, if no such recesses of the semi-finished fiber composite product are provided, these layers can be provided between respective regions on a flat side of the semi-finished fiber composite product and the holding elements, for example.

In another embodiment, attachment of the holding elements is implemented, in each instance, by riveting them to the semi-finished fiber composite product. For this purpose, rivets, e.g. countersunk rivets, can be used, particularly, for example, made of a relatively soft metal material (e.g. aluminum or aluminum alloy; preferably, in any case, softer than the material of the molding tool). In this connection, the rivets or countersunk rivets can pass through attachment holes (preferably provided with a countersunk portion) of the holding elements and further through (coaxially arranged) attachment holes of the semi-finished fiber composite product. Alternatively or in addition to a countersunk portion of the attachment holes of the holding elements, the attachment holes of the semi-finished fiber composite product can also be configured with a countersunk portion.

According to a further aspect of the present invention, a method for the production of a fiber composite component by means of molding a planar semi-finished fiber composite product in a molding tool is provided, in which method a semi-finished product arrangement of a conventional or of the inventive arrangement is used, wherein during molding, the edge of the semi-finished fiber composite product runs at least in part, particularly entirely within the molding tool, and the holding elements each extend out of the molding tool.

If a semi-finished product arrangement of the type according to the invention is used in this method, then, as has already been explained, the risk of damage to or wear of the molding tool is reduced or entirely eliminated by means of the countersunk arrangement of the holding elements.

However, in the event that such a countersunk arrangement of the holding elements is not provided for in the method, it has been shown that the method can nevertheless often be carried out with at most slight wear, namely, in particular, when the holding elements are each configured as elongated holding strips, arranged co-planar to the plane of the semi-finished fiber composite product, particularly with a ratio of the width of the holding strips of more than 3, particularly more than 5. On the other hand, this ratio can be less than 100, particularly less than 50, for example.

In practice, it is probably due to the fact that such "flat" holding elements are more or less pressed into (countersunk into) the material of the semi-finished fiber composite product during the molding process that no significant wear of the molding tool occurs. In this regard, an embodiment is preferred in which the height (thickness) of the holding elements is less than 0.3 times, particularly less than 0.2 times the height (thickness) of the semi-finished fiber composite product in the region bordering on the fixation location. Once again, a shape-fit connection of the type described above, for example, can be used for fixation, or also a rivet connection with the semi-finished fiber composite product, for example, can be provided.

According to a preferred use of a semi-finished product arrangement of the type described here and/or of a method of the type described here, the production of structural components for vehicles, particularly aircraft, is provided.

According to a more specific use of a semi-finished product arrangement of the type described here and/or of a method of the type described here, the production of what are called "clips" for the production of a vehicle hull, particularly, e.g., a hull or hull section of an aircraft, composed of hull shell, stringers, frames, and clips, is provided.

In this connection, stringers are understood to be reinforcement elements running longitudinally on the inside of the hull shell (e.g. profiles), whereas the frames represent reinforcement elements that run in the circumference direction on the inside of the hull shell (e.g. profiles). In this connection, the clips are connection elements, in the meaning usual in the industry, for creating a connection between a frame and the hull shell.

Furthermore, it would also be conceivable, in the production of a vehicle hull composed of hull shell, stringers, and frames, to produce other connection elements according to the invention for connecting these components with one another, for example for creating a connection between a frame and at least one stringer, or for creating a connection between a frame and at least one stringer and the hull shell. Such a connection element or the stated clip can be connected with the components in question at the corresponding locations, for example by means of an adhesive connection or a rivet connection.

BRIEF DESCRIPTION OF THE DRAWING FIGURES

Figure 2:
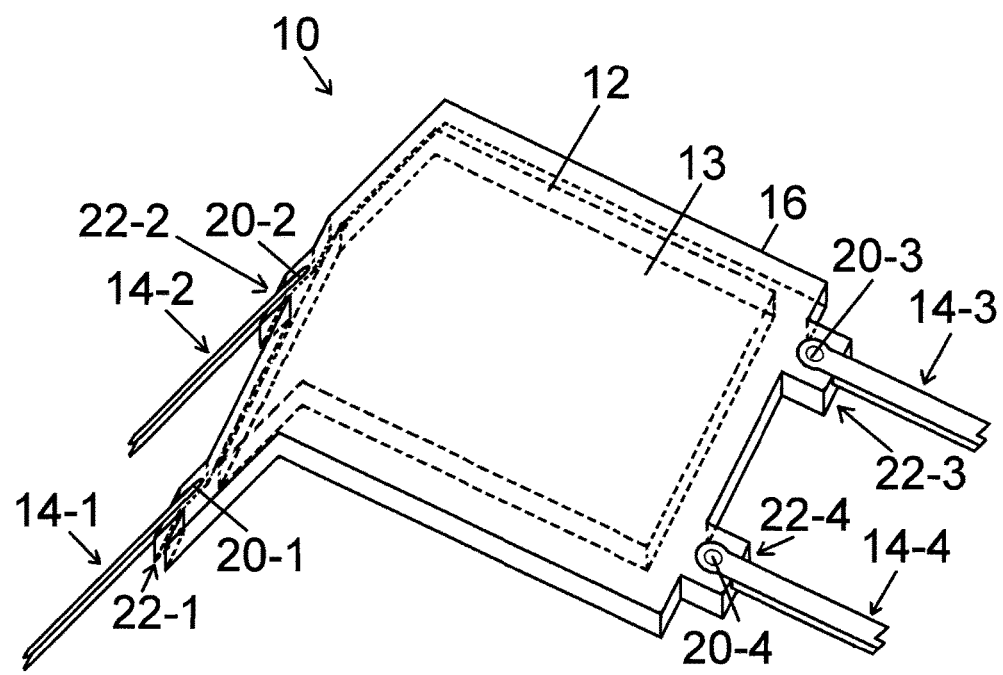
Figure 3:
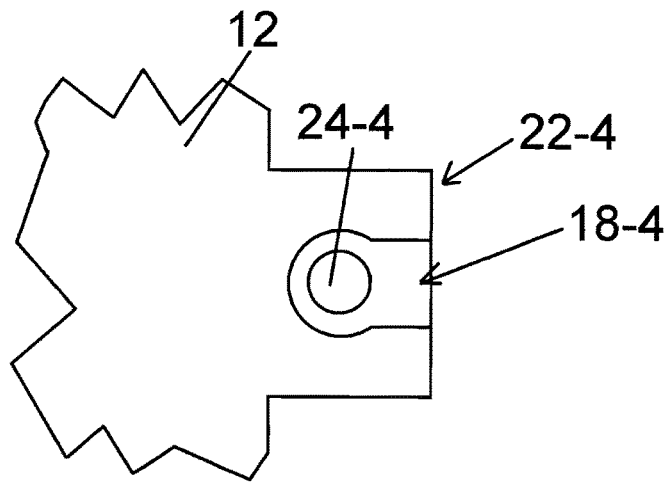
Figure 4:
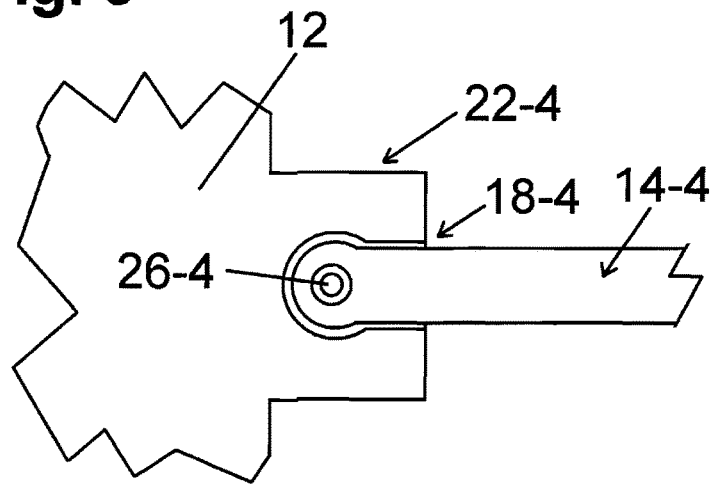
Figure 5:
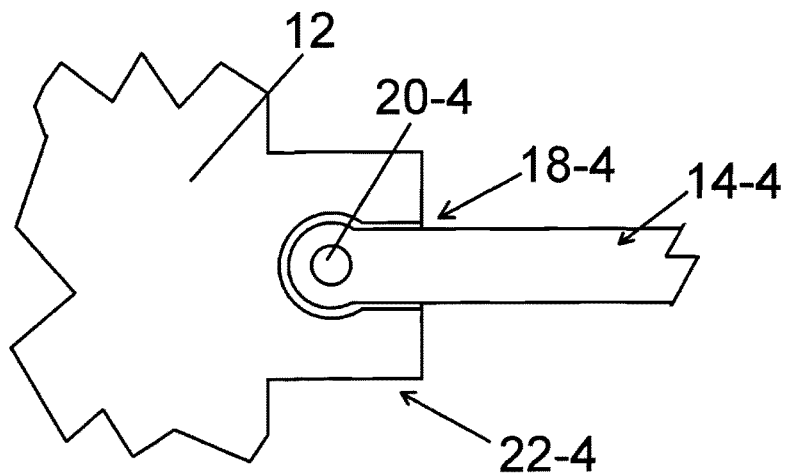
Figure 6:
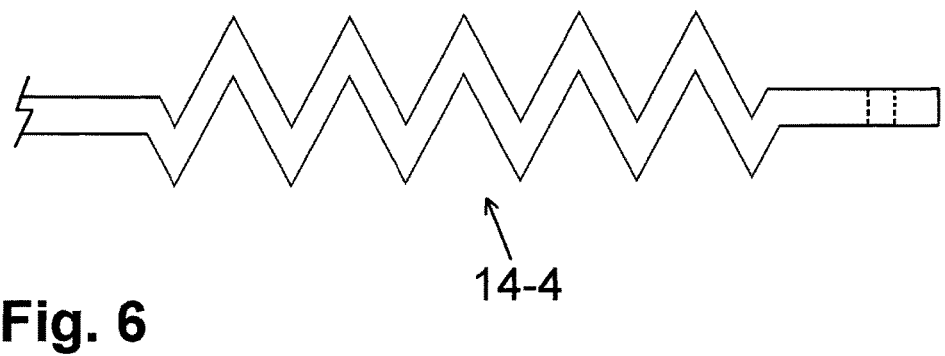
Figure 7:
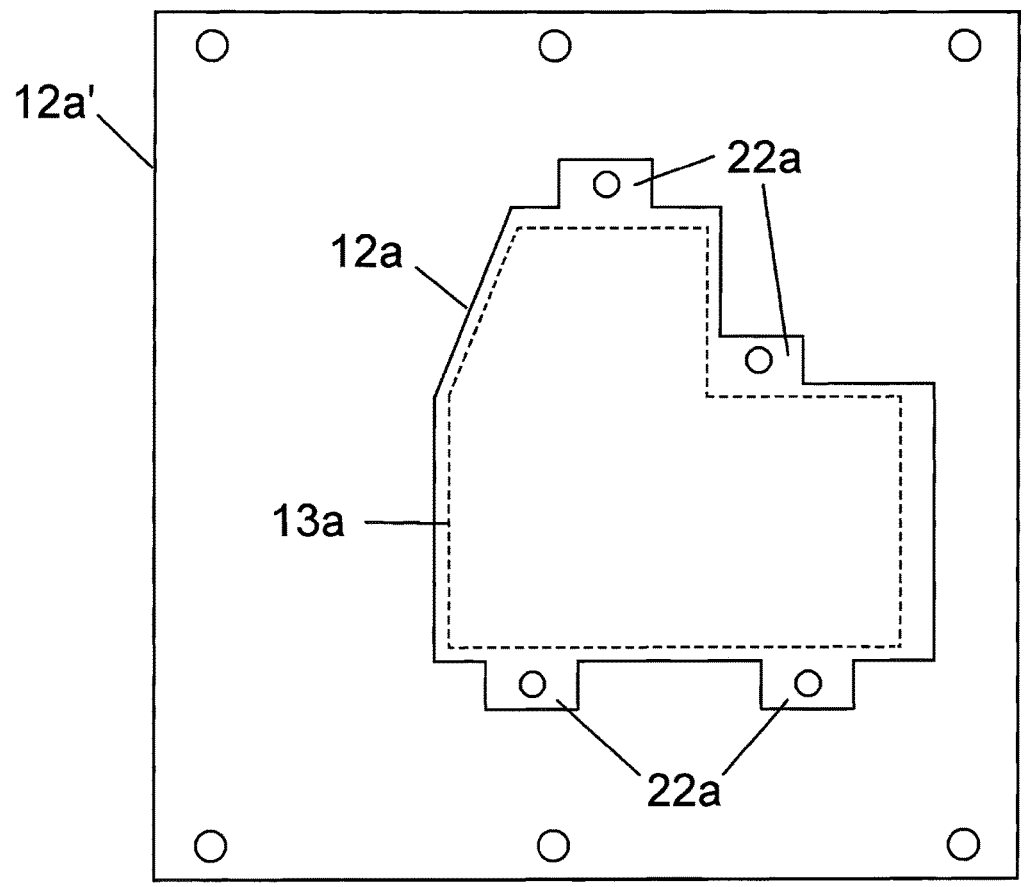

Hereinafter, the invention will be described further using exemplary embodiments and making reference to the attached drawings. These show:

FIG. 1 a perspective view of a semi-finished product arrangement according to an exemplary embodiment, together with a lower tool half of a molding tool used for molding, FIG. 2 a perspective view of the molded semi-finished product arrangement of FIG. 1 (after removal from the molding tool), FIG. 3 a top view of a detail, indicated in FIG. 1 with III, of the semi-finished product arrangement in a first stage of the production of the semi-finished product arrangement, FIG. 4 a view corresponding to FIG. 3, in a second stage of the production of the semi-finished product arrangement, FIG. 5 a view corresponding to FIG. 3, in a third stage of the production of the semi-finished product arrangement, FIG. 6 a side view of a holding strip in a region that lies outside of the molding tool in question during the molding process, and FIG. 7 a comparison representation, as an example, for comparing the material expenditure for the production of a specific fiber composite component, on the one hand according to the state of the art and on the other hand according to the invention.

DETAILED DESCRIPTION

FIGS. 1 and 2 show a semi-finished product arrangement 10, where in FIG. 1, a lower tool half 2 (lower tool) having a lower mold surface 4 is furthermore shown in the drawing to illustrate a molding process carried out using the semi-finished product arrangement 10.

For this molding process, a corresponding upper tool half (upper tool) of the molding tool is also provided, but for the sake of simplicity of the representation, it has not been shown in FIG. 1.

The semi-finished product arrangement 10 comprises a planar semi-finished fiber composite product 12 to be molded by the tool, and furthermore multiple (in the example shown: four) holding strips 14-1 to 14-4 fixed in place on (here: attached to) the semi-finished fiber composite product 12 and each extending beyond the edge of the semi-finished fiber composite product 12.

These holding strips 14-1 to 14-4, hereinafter also referred to as "holding strips 14," are formed from a metal material such as an aluminum alloy, for example, in the example shown, and serve to hold the semi-finished fiber composite product 12 in a desired position during the molding process illustrated in FIG. 1, in order to thereby particularly prevent slipping or undesirable fold formation, before the molding process has been completed.

In the example shown, and this is a preferred embodiment within the scope of the invention, the semi-finished fiber composite product 12 is a fiber-reinforced (e.g. carbon-fiber-reinforced) semi-finished thermoplastic product, in other words a thermoplastic material (e.g. PEI, PPS or PEEK) with reinforcement fibers embedded therein. The fiber material (e.g. carbon fiber material) can particularly be a woven fabric, laid scrim or braid of fibers or preferably fiber bundles ("rovings"), or preferably a multi-layer laminate composed of multiple layers of such textile surface structures.

The distal ends (not shown in FIGS. 1 and 2) of the holding strips 14 can be fixed in place on or attached to a holding frame, for example, so that the semi-finished fiber composite product 12 is held or "spread open" within the frame by way of the holding elements 14. In the processing of a semi-finished thermoplastic product, this semi-finished fiber composite product (often referred to as a "board") can be heated in such a held state and laid into the molding tool in question and finally molded.

FIG. 2 shows the semi-finished product arrangement 10 after completion of the molding of the semi-finished fiber composite product 12.

The actual fiber composite component 13 to be produced is shown with a broken line in FIG. 2, and is subsequently milled, for example, from the molded semi-finished fiber composite product 12 (FIG. 2).

The fiber composite component 13 shown as an example in FIG. 2 is significantly smaller than the molding tool used for molding (cf. lower tool 2 shown in FIG. 1). The molding tool, which is therefore dimensioned to be "relatively large," has the advantage that components of different sizes can be produced using the same tool (up to the size of the molding tool). A further advantage consists in that components having different molded shapes can be produced using the same tool, by means of a variation in the positioning of the semi-finished fiber composite product.

As is evident from FIG. 1, the semi-finished product arrangement 10 used or the semi-finished fiber composite product 12 can accordingly also be dimensioned smaller or larger and/or "molded at a different location," in order to accordingly produce a smaller or larger component or one having a different molded shape.

A major advantage, as compared with the state of the art, of the semi-finished product arrangement 10 illustrated in FIG. 1 or of the production process carried out therewith consists in that the size of the semi-finished fiber composite product 12 at most needs to be slightly larger than the size of the actual fiber composite component 13 to be produced, because the semi-finished product arrangement 10 is configured in such a manner that it is advantageously made possible for the edge of the semi-finished fiber composite product 12, indicated with 16 in FIG. 1, to run at least in part, particularly, as shown, entirely within the molding tool (between lower and upper tool) and for the holding strips 14 to each extend (laterally) out of the molding tool.

The particular characteristic of the semi-finished product arrangement 10 provided for this purpose consists in that the holding strips 14-1 to 14-4 are arranged to be countersunk in respective recesses 18-1 to 18-4, in order to avoid a projection in terms of height.

By means of this measure, tool damage during the molding process can advantageously be avoided, because the height (thickness) of the holding strips 14-1 to 14-4 is more or less partially or entirely "made to disappear," depending on the depth of the recesses 18-1 to 18-4 in comparison with the height (thickness) of the holding strips 14-1 to 14-4.

In the exemplary embodiment shown according to FIG. 1, for example, the exposed surfaces of the holding strips 14-1 to 14-4 are arranged to be countersunk flush with the surface of the semi-finished fiber composite product, in each instance, in the region bordering on the recesses 18-1 to 18-4.

This "countersinking" is needed only in the region of the semi-finished fiber composite product 12 occupied by the holding strips 14-1 to 14-4. In this connection, the recesses 18-1 and 18-4 each possess a contour that is adapted to the contour of the holding strip in question (in general: holding element) in this region.

In the exemplary embodiment shown, the contour of the holding strips 14 is substantially elongated and rectangular, in each instance, the proximal end, however (which is attached to the semi-finished fiber composite product 12 by means of riveting), being somewhat widened and configured with a round contour. Attachment is implemented with countersunk rivets 20-1 to 20-4 in the example shown.

The contour of the respective recesses 18-1 to 18-4 follows the aforementioned contour of the holding strips 14-1 to 14-4, so that the holding strips 14 are each arranged in the recesses 18 "with slight play."

If one compares the contour of the fiber composite component 13 with the contour of the "pre-product" (semi-finished fiber composite product 12) in FIG. 2, a further particular characteristic, which can be advantageously implemented within the scope of the invention, will be noticed, which consists in that the contour of the semi-finished fiber composite product 12 substantially (with a comparatively slight, preferably uniform projection) follows the contour of the component 13 to be produced, sizable protrusions (projections) of the semi-finished fiber composite product 12 being provided only at those locations in the region of the edge 16 at which the holding strips 14 each project into the region of the semi-finished fiber composite product 12, and are fixed in place on or attached to the semi-finished fiber composite product 12.

This measure advantageously further minimizes the material demand and can be used independent of the concrete shaping or contour of the fiber composite component to be produced.

Coming back once more to the "countersunk arrangement" of the holding strips (14) or, in general, holding elements in the region of the semi-finished fiber composite product (12), here are some generally applicable considerations:

Let the height (thickness) of the semi-finished fiber composite product in the region of the recesses (18), or, in the case of uniform thickness in all the regions of the semi-finished fiber composite product, be referred to as "D."

Let the assumed uniform height (thickness) of the holding elements or holding strips in the proximal region (lying within the molding tool during the molding process) be referred to as "d."

In a preferred embodiment, the recesses do not pass through the material of the semi-finished fiber composite product completely, seen in the height direction, in each instance, but rather are provided as a recess only on one surface side. If, in this connection, the recess depth is referred to as "a" and the height (thickness) of the remaining semi-finished product material as "b," then it holds true that $D=a+b$.

Advantageously, one or more of the following dimensioning rules (for the semi-finished product arrangement that has not yet been molded) can be provided:

$a>0.05D$, particularly $a>0.1D$ (Rule 1)

$a<0.5D$, particularly $a<0.4D$ (Rule 2)

$a>0.8d$, preferably $a>1.0d$ (Rule 3)

$a<3d$, preferably $a<2d$ (Rule 4)

With the dimensioning rule "$a>d$," those cases in which the molding process involves noteworthy compression, in terms of height, of the semi-finished fiber composite product, can advantageously be taken into account.

FIGS. 3 to 5 illustrate the manner of attaching (riveting) the holding strips 14 in the case of the semi-finished product arrangement 10 already described with reference to FIGS. 1 and 2, using the example of attachment of the holding strips 14-4 (cf. region marked with III in FIG. 1).

In a first step, the recess 18-4 is worked into (e.g. milled into) the semi-finished fiber composite product 12 that has already been prepared in desired manner, as shown in FIG. 3.

In the example shown, the recess 18-4 possesses a uniform recess depth (indicated above with "a"), however, an attachment hole 24-4 that passes completely through the semi-finished fiber composite product 12 being configured at the later riveting location.

In a second step, the proximal end of the holding strip 14-4 is laid into the recess 18-4, as shown in FIG. 4.

Seen in the top view of FIG. 4, only a small gap remains between the contour of the recess 18-4, on the one hand, and the contour of the holding strip 14-4, on the other hand, in the region of this recess 18-4.

In this connection, a countersunk hole 26-4 of the holding strip 14-4, situated at the later riveting location, comes into congruence with the attachment hole 24-4 of the semi-finished fiber composite product 12.

In a third step, finally, the countersunk rivet 20-4 is inserted, passing through the holes 24-4 and 26-4, and correspondingly deformed, in order to attach the proximal end of the holding strip 14-4 to the fiber composite material 12, as shown in FIG. 5.

FIG. 6 illustrates one possibility for implementing a tension spring effect of holding elements used within the scope of the invention, and shows a distal region (which is no longer shown in FIGS. 1 and 2) of the holding strip 14-4.

In this region, the holding strip 14-4 possesses a zigzag-like shaping, which makes the desired spring effect available.

FIG. 7 is a representation for illustrating the extent of the material saving that can be achieved with the present invention.

In FIG. 7, shaping of a semi-finished fiber composite product 12a and the shape described therein of the specific region 13a that is ultimately required for the fiber composite component to be produced is shown merely as an example.

According to the invention, it is possible to more or less "custom-tailor" the semi-finished fiber composite product 12a, in other words to adapt it to the actually required shape of the fiber composite component to be produced (cf. material region 13a), even if the semi-finished fiber composite product 12a turns out to be significantly smaller than the molding tool used for molding, as a result.

In the state of the art, a significantly larger cut piece 12a' of fiber composite material was needed for the production of the same fiber composite component (cf. material region 13a) by means of the same molding tool, actually dimensioned to be "too large," so that the edge of the cut piece 12a' projects beyond the edge of the molding tool all around.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A semi-finished product arrangement for producing a fiber composite component by molding of a planar semi-finished fiber composite product in a molding tool, the arrangement comprising:

the planar semi-finished fiber composite product; and
multiple holding elements fixed in place on the planar semi-finished fiber composite product and each extending beyond a lateral edge of the planar semi-finished fiber composite product, wherein the planar semi-finished composite product comprises multiple recesses, wherein the multiple holding elements are countersunk in the recesses to avoid a height projection of the multiple holding elements, wherein the holding elements are each elongated holding strips being attached to the planar semi-finished fiber composite product at a proximal end of the holding strip, and wherein the proximal end is widened.

2. The semi-finished product arrangement of claim 1, wherein the recesses each have a contour adapted to a contour of the corresponding holding element.

3. The semi-finished product arrangement of claim 1, wherein the exposed surfaces of the holding elements are each arranged to be countersunk or at most substantially flush with a surface of the planar semi-finished fiber composite product in a region bordering on the recess.

4. The semi-finished product arrangement of claim 1, wherein the holding elements are each disposed co-planar to a plane of the planar semi-finished fiber composite product.

5. The semi-finished product arrangement of claim 1, wherein at least certain sections of the holding elements are formed entirely from a metal material.

6. The semi-finished product arrangement of claim 1, wherein at least certain sections of the holding elements are formed entirely from a fiber-reinforced plastic material.

7. The semi-finished product arrangement of claim 1, wherein the holding elements each possess a shaping providing a tension spring effect.

8. The semi-finished product arrangement of claim 1, wherein the holding elements are each fixed in place on the planar semi-finished fiber composite product by rivets.

* * * * *